United States Patent [19]

vandenEnden et al.

[11] Patent Number: 5,717,812
[45] Date of Patent: Feb. 10, 1998

[54] HOLDER FOR FIBER OPTIC SPLICE CONNECTORS

[75] Inventors: John Peter vandenEnden, Oshawa; Gregory Hubert Porter, Newmarket, both of Canada

[73] Assignee: The Whitaker Corporation, Wilmington, Del.

[21] Appl. No.: 678,010

[22] Filed: Jul. 10, 1996

Related U.S. Application Data

[60] Provisional application No. 60/003,331, Sep. 7, 1995.

[51] Int. Cl.$^6$ .................................................. G02B 6/36
[52] U.S. Cl. ................................................... 385/135
[58] Field of Search ...................................... 385/134, 135, 385/136, 137, 138

[56] References Cited

U.S. PATENT DOCUMENTS

| | | | |
|---|---|---|---|
| 4,373,776 | 2/1983 | Purdy | 350/96.2 |
| 4,489,830 | 12/1984 | Charlebois et al. | 206/316 |
| 4,666,240 | 5/1987 | Caron et al. | 385/135 |
| 4,792,203 | 12/1988 | Nelson et al. | 350/96.2 |
| 4,793,681 | 12/1988 | Barlow et al. | 350/96.2 |
| 4,824,196 | 4/1989 | Bylander | 350/96.2 |
| 4,995,728 | 2/1991 | Finzel | 350/96.21 |
| 5,071,211 | 12/1991 | Debortoli et al. | 385/76 |
| 5,121,456 | 6/1992 | Essert et al. | 385/70 |
| 5,127,082 | 6/1992 | Below et al. | 385/135 |
| 5,138,688 | 8/1992 | Debortoli | 385/135 |
| 5,274,729 | 12/1993 | King et al. | 385/134 |
| 5,351,331 | 9/1994 | Chun et al. | 385/136 |
| 5,353,367 | 10/1994 | Czosnowski et al. | 385/135 |
| 5,363,465 | 11/1994 | Korkowski et al. | 385/135 |
| 5,363,466 | 11/1994 | Milanowski et al. | 385/135 |
| 5,367,594 | 11/1994 | Essert et al. | 385/70 |
| 5,402,515 | 3/1995 | Vidacovich et al. | 385/135 |
| 5,412,497 | 5/1995 | Kaetsu et al. | 385/134 |
| 5,420,958 | 5/1995 | Henson et al. | 385/135 |
| 5,450,517 | 9/1995 | Essert | 385/135 |
| 5,472,160 | 12/1995 | Burek et al. | 385/135 |

*Primary Examiner*—John Ngo

[57] ABSTRACT

The invention comprises holder for a fiber optic connector which has a housing with a front side, a top, a bottom, and two ends. The ends have securing members to secure the housing to a telecommunications rack. A recess is disposed along the front side of the housing. The recess extends from the top to the bottom of the housing and is open to the top and to the bottom. The recess has dimensions such that a fiber optic splice connector is received substantially within the recess. The recess has a latch member for securing the fiber optic splice connector within the recess. The recess further has a projection for preventing the splice connector from moving out the top and the bottom of the housing, while having the recess open to the top and the bottom for access to the splice connector.

16 Claims, 5 Drawing Sheets

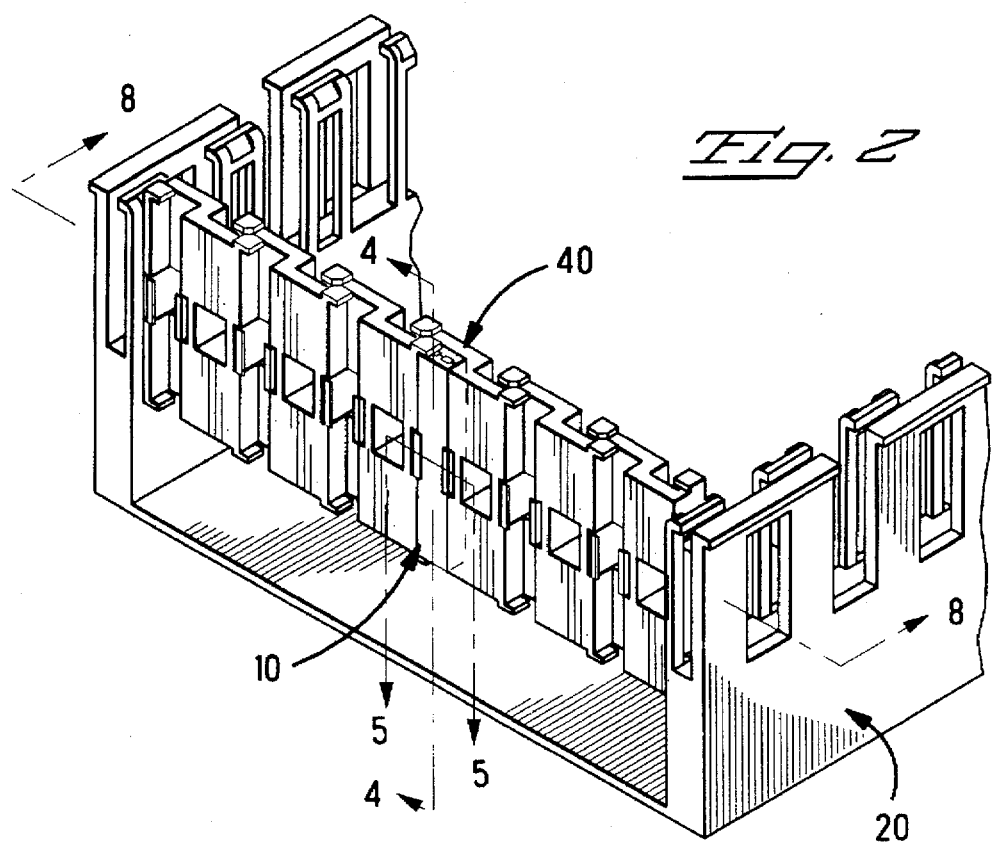
Fig. 2
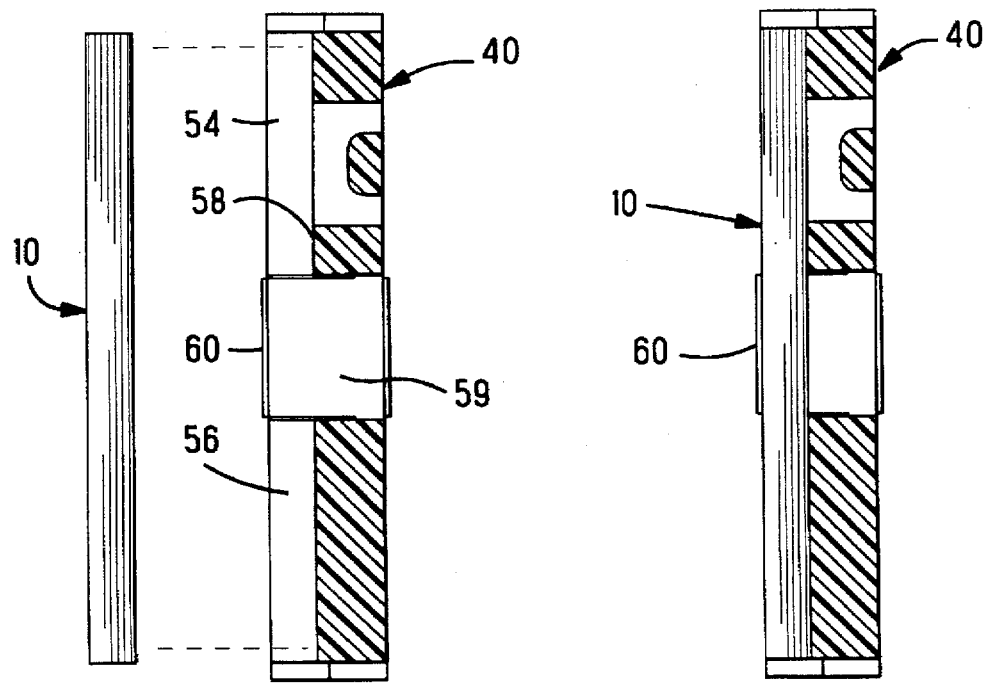
Fig. 3
Fig. 4

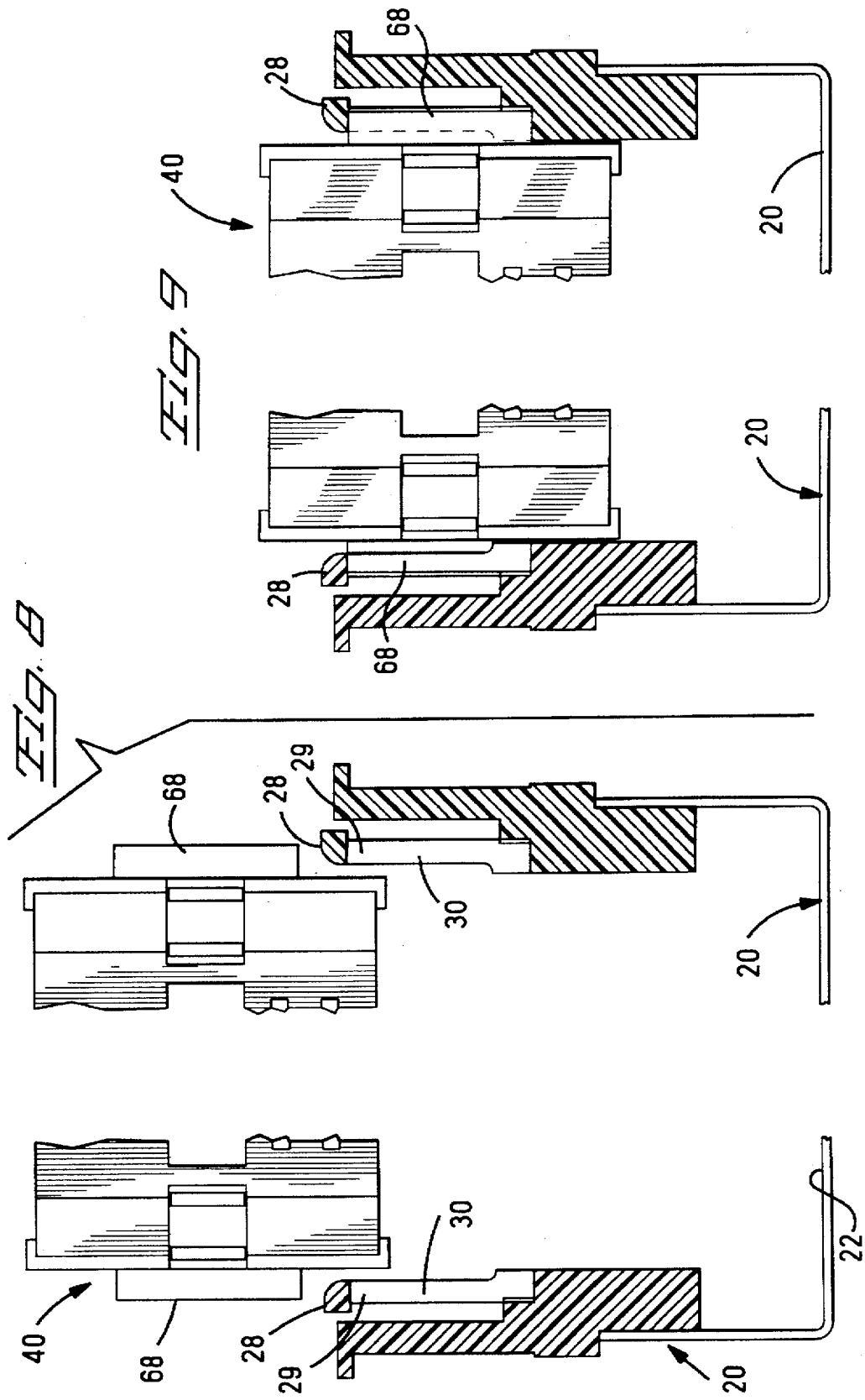

HOLDER FOR FIBER OPTIC SPLICE CONNECTORS

This application claims the benefit of U.S. Provisional application No. 60/003331 filed Sep. 7, 1995.

FIELD OF THE INVENTION

This invention relates to a tray for holding optical splice connectors and more particularly to a tray for holding optical splice connectors which can be mounted into existing telecommunication racks.

BACKGROUND OF THE INVENTION

A building with multiple occupants will often have a telecommunications box. This box would contain a rack which holds electrical connectors to connect the incoming telecommunications lines with the different services and occupants in the building in order to provide voice and data communications. The electrical connector comprises typically twenty-five individual connections such that twenty-five lines can be interconnected. One such telecommunication rack is the BIX mount which includes a rack system and BIX connectors.

Other optical rack systems are know in which trays are used to hold optical fibers, the trays are then mounted into the rack system. U.S. Pat. No. 5,138,688 discloses a connector holder assembly for holding optical connectors. The assembly comprises a frame for holding a stack of connector holders. The connector holders are planar and include an area for mounting optical connectors and a storage area for the fibers. These holders are assembled into the optical fiber frames.

It would be an advantage to have a holder for fiber optic splice connectors which can fit into existing telecommunications racks.

SUMMARY OF THE INVENTION

The invention comprises a fiber optic connector holder which has a housing with a front side, a top, a bottom, and two ends. The ends have securing members to secure the housing to a telecommunications rack. A recess is disposed along the front side of the housing. The recess extends from the top to the bottom of the housing and is open to the top and to the bottom. The recess has dimensions such that a fiber optic splice connector is received substantially within the recess. The recess has a latch member for securing the fiber optic splice connector within the recess. The recess further has a projection for preventing the splice connector from moving out the top and the bottom of the housing, while having the recess open to the top and the bottom for access to the splice connector.

The invention further comprises a fiber optic connector holder which has a housing with a front side, a top, a bottom, and two ends. The ends have securing members to secure the housing to a telecommunications rack. A recess is disposed along the front side of the housing. The recess extends from the top to the bottom of the housing and is open to the top and to the bottom. The recess has dimensions such that a fiber optic splice connector is received substantially within the recess. The recess has a latch member for securing the fiber optic splice connector within the recess. The recess further has a projection for preventing the splice connector from moving out the top and the bottom of the housing, while having the recess open to the top and the bottom for access to the splice connector. A splice connector to be received within the recess, the connector has a connecting passageway to connect two fiber optic cables.

The invention further comprises a fiber optic connector assembly which has a telecommunications rack with a base and upstanding latching arms. A holder which has a housing with a front side, a top, a bottom, and two ends. The ends have securing members to secure the housing to a telecommunications rack. A recess is disposed along the front side of the housing. The recess extends from the top to the bottom of the housing and is open to the top and to the bottom. The recess has dimensions such that a fiber optic splice connector is received substantially within the recess. The recess has a latch member for securing the fiber optic splice connector within the recess. The recess further has a projection for preventing the splice connector from moving out the top and the bottom of the housing, while having the recess open to the top and the bottom for access to the splice connector. A splice connector to be received within the recess, the connector has a connecting passageway to connect two fiber optic cables.

BRIEF DESCRIPTION OF THE DRAWING

An embodiment of the present invention will now be described by way of example with reference to the accompanying drawings, in which:

FIG. 2 is an assembled isometric view similar to FIG. 1;

FIG. 3 is an exploded cross sectional taken along the line 3—3;

FIG. 4 is an assembled cross sectional similar to FIG. 3;

FIG. 8 is an exploded cross sectional showing the rack and the holder;

FIG. 9 is an assembled cross section similar to FIG. 8; and

DETAILED DESCRIPTION OF THE INVENTION

Typical fiber optic splice connectors, known as CORELINK splice connectors, are disclosed in U.S. Pat. No. 5,121,456 which is hereby incorporated by reference. The connector, which is shown generically in FIG. 1 as 10, is a splice connector having two body halves which operate as spring clamps with an internal passageway 18 between the two body halves for two optical fibers to be spliced. There is also a passageway 19 for receiving a key element to force the two body halves apart in order to insert or remove a fiber from the splice connector. When the key element is removed, the spring clamps hold the fibers in place within the splice. When assembled with two fibers, the fibers extend out from the passageways 18 from both ends 14, 16.

Figure 1:
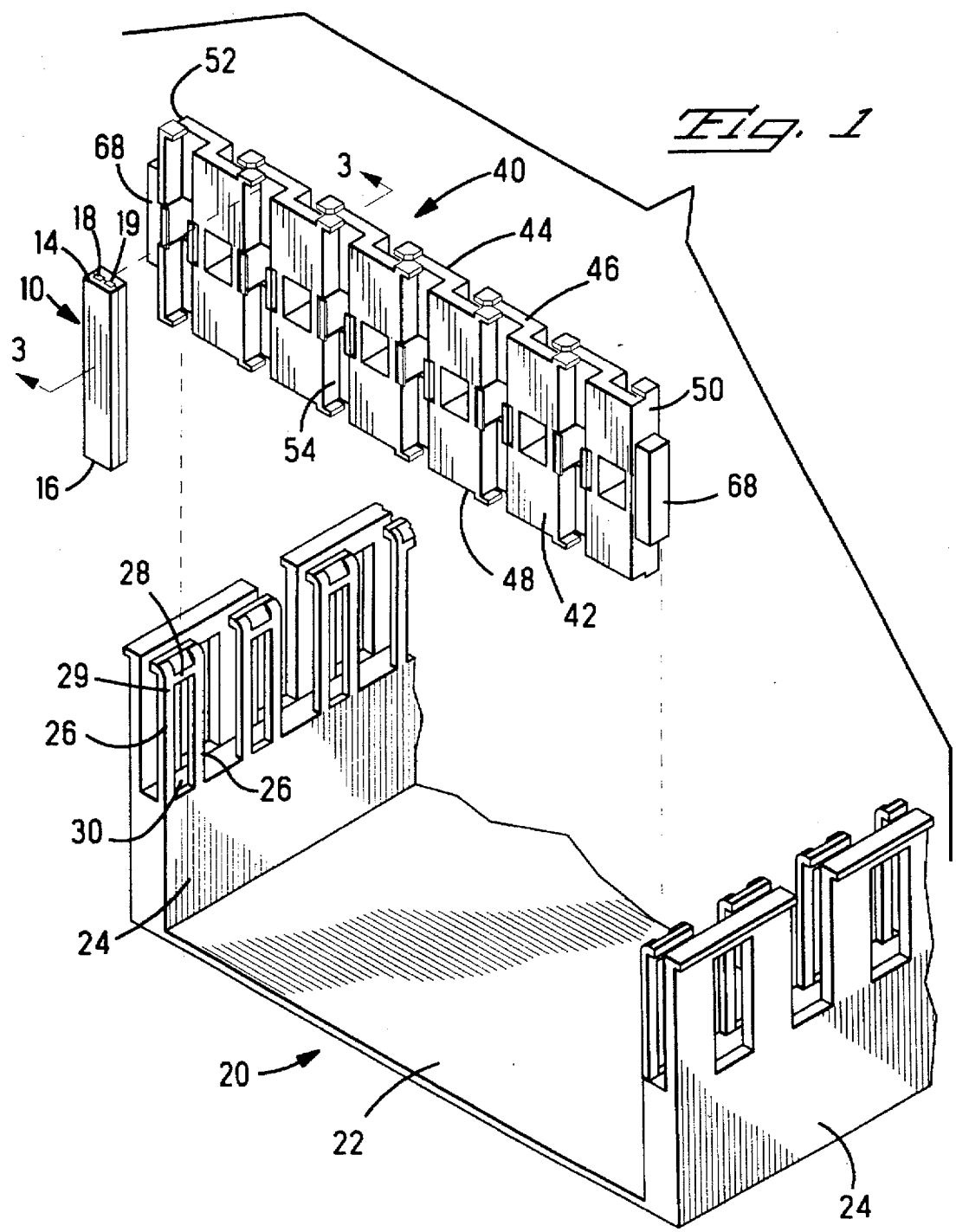
FIG. 1 is an exploded isometric view of a telecommunications rack, the holder of the current invention and a fiber optic splice.

A typical fiber optic splice connector 10 is rectangular as is shown in FIG. 1. The optical fibers extend longitudinally through the splice connector and extend from the passageway 18 of the splice connector 10 from either end 14, 16.

A typical rack assembly for telecommunications is shown in FIG. 1. The rack assembly is typically mounted upright along a wall, but is shown and described here from a position in which it is lying down. The rack 20 has a flat base 22 with side walls 24 extending upwardly on either side of the flat base. The rack is typically mounted onto a wall or frame or any other reasonably flat surface by securing the base thereto. Resilient arms 26 extend upwardly from the walls 22. Each pair of arms 26 has a cross arm 28 extending therebetween at an end opposite from the side wall 24. Two arms 24 and the cross arm 28 form a latch 29 for securing an electrical connector to the rack. A recess 30 is located between the two arms 24 and the cross arm 30. The connector is secured to the rack by being received between two opposing latches. The rack is shown having spaces for receiving three connectors, but the rack can also be made to accommodate any number of connectors.

Figure 5:
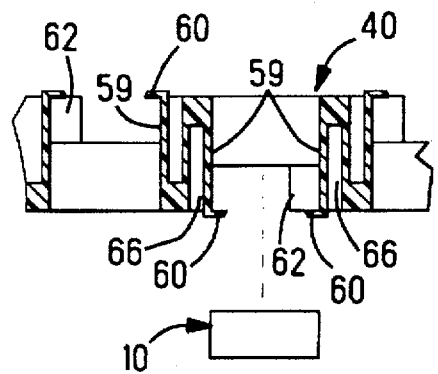
FIG. 5 is an exploded cross sectional taken from the line 5—5.
Figure 6:
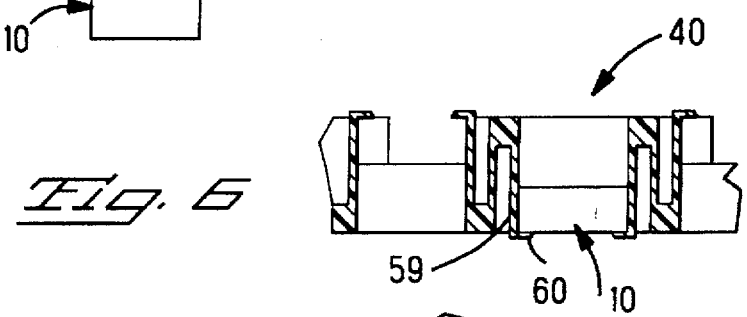
FIG. 6 is an assembled cross sectional similar to FIG. 5.
Figure 7:
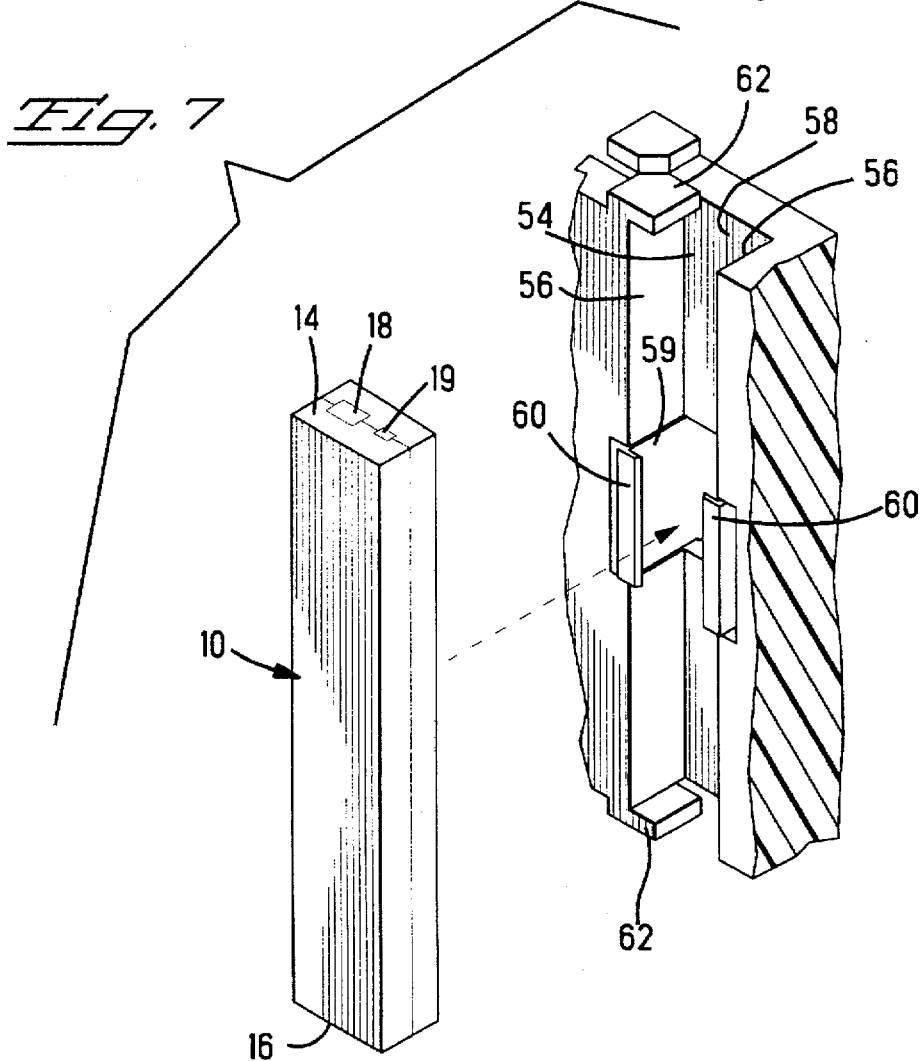
FIG. 7 is an exploded isometric view showing the holder and the optic splice.

The rack system typically has electrical connectors having double sided insulation displacement clips, not shown. FIG. 1 shows a holder 40 for fiber optic splice connectors which is adapted to be received within the rack assembly and to fit within the rack assembly in a similar manner as the electrical connector. The holder 40 has a front side 42 and a back side 44, a top side 46, and a bottom side 48 and two ends 50, 52. Along both the front side 42 and the back side 44 are recesses 54 which extend from the top 46 to the bottom 48. There are several recesses disposed along the length of the holder on both the front and the back sides of the holder. This particular embodiment shows a total of twelve recesses, six on each side, but the holder could be designed with a variety of different numbers of recesses. The recesses are approximately the same size as the fiber optic splice connector, such that when the splice connector is received within the recess, the splice connector is substantially within the holder but is still accessible from outside the holder. The recesses 54 each have two side walls 56 and a bottom wall 58. The depth of the recess is approximately the same as the fiber optic splice connector, see FIG. 9. Along each side wall is a resilient finger 59 with a protrusion 60 on the end which is directed in towards the center of the recess. An opening 66 behind the resilient finger allows the finger to be moved out of the way so that the splice connector can be inserted into or removed from the recess, see FIG. 5. Along the top and the bottom of the holder, there are projections 62 which extend along the ends of the recesses, but do not completely cover the ends of the recesses, thereby allowing access to a splice connector within the recess.

On both ends 50, 52 of the holder 40 are securing projections 68, see FIG. 1. The projections 68 are approximately the same size as the recesses 30 on the latching arms 29.

The preferred use of the holder comprises inserting at least one fiber optic cable into one end 16 of the CORELINK fiber optic splice connector and into the passageway 18. A second fiber may also be inserted into the splice connector from the other end 14, but it is not necessary at this stage. The splice connector 10 is then inserted into a recess 54. The resilient fingers 58 are received around the splice connector to hold the splice connector in the recess 54. The projections 62 prevent the splice connector 10 from moving out either the top 46 or the bottom 48 of the holder 40. The optical fiber extends out the recess along the bottom of the holder. Alternatively, the splice connector 10 can be mounted into the recess 54 and the fiber optic cable can be inserted into the connector while it is mounted in the recess as the passageways are both accessible from the ends of the holder.

Several other splice connectors can be inserted into the recesses. When all the connectors are inserted, the holder can then be inserted into the rack assembly as is shown in FIG. 8 and FIG. 9. The securing projections 68 are pushed past the cross arm 28 on the latch arms 29. The latch resiliently springs back to the original position. The securing projections 68 on either end are received into the recess 30 on the latching arm thereby securing the holder to the rack. FIG. 2 shows one splice connector 10 installed in the holder 40 and the holder installed in the rack.

The top end 14 of the fiber optic splice connector is accessible from the top 46 of the holder. New optical fibers can be inserted into the fiber optic splice connector or existing optical fibers can be removed or changed by inserting the key element between the body halves and forcing them apart. The other optical fiber extends below the holder toward the base plate and can be stored within the base plate, not shown.

Figure 10:
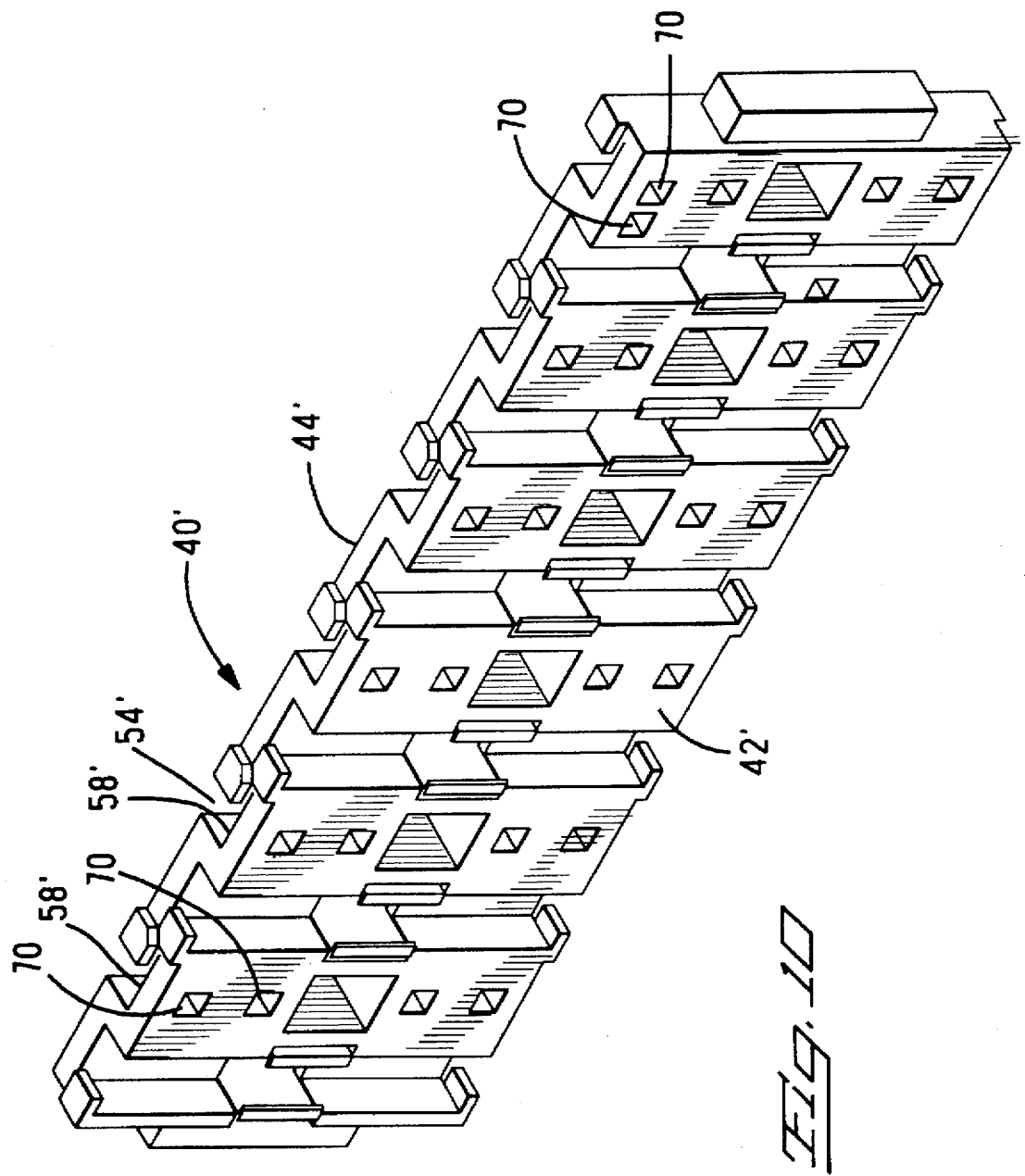
FIG. 10 is an isometric view of the fiber optic connector holder having holes for tie wraps.

FIG. 10 shows an alternative fiber optic holder 40'. The holder 40' includes apertures 70 which extend from one face of the holder 40' through to the bottom wall 58' of the recess 54'. There are at least four apertures 70 which correspond to each recess 54'. Two of the apertures 70 being along the top of the holder 40' and two of the apertures 70 being along the bottom of the holder. A recess 54' at one end of the holder 40' has six apertures 70, three along the top and three along the bottom. The apertures 70 are adapted to receive a tie wrap therethrough, not shown. A tie wrap is feed through one aperture from the front side 42', through to the back wall 58' of the recess 54', and into the recess 54'. The tie wrap is then feed back through an adjacent aperture, through the back wall 58' and back out the front side 42' the holder 40'. The tie wrap can then be used to secure a cable along the front side 42' of the holder 40'. When tie wraps are inserted along the length of the holder 40', they can be used to secure a cable which houses a series of fiber optic cables along the front side 42' of the holder to supply individual fiber optic cables to the individual connectors. Where there is a grouping of three apertures, such as in the right of FIG. 10, the tie wrap can be secured in either a horizontal or a vertical position. The use of a tie wrap in a horizontal position allows an individual fiber optic cable and slack cable for the connector to be secured and to ensure the proper bending radius of the fiber optic cable. The holder 40' can be designed with the apertures in a variety of configurations depending on the use of the holder. Furthermore, additional apertures 70 can extend through the back side 44' of the holder 40', not shown, such that cables can be secured both along the front side and the back side of the holder 40'.

The fiber optic connector holder is capable of being installed in the rack regardless of the orientation of the holder, that is to say, it can be inserted forwards, backwards, right side up or upside down. Orientation has no effect on the functionality of the holder 40.

A holder for fiber optic splice connectors has been provided which can be inserted into an existing telecommunications wiring box. This holder has the advantage that new telecommunications boxes do not need to be installed. Fiber optic cables can be provided to a building using the existing telecommunications rack assembly.

The fiber optic splice connector holder of the present invention and many of its attendant advantages will be understood from the foregoing description. It is apparent that various changes may be made in the form, construction, and arrangement of parts thereof without departing from the spirit or scope of the invention, or sacrificing all of its material advantages.

We claim:

1. A fiber optic connector holder, comprising:
   a housing having a first side, a top, a bottom, and two ends, the ends having securing members to secure the housing to a telecommunications rack;
   a recess disposed along the first side of the housing, the recess extending from the top to the bottom of the housing and being open to the top and to the bottom, the recess having dimensions such that a fiber optic splice connector is received substantially within the recess;
   a latch member for securing the fiber optic splice connector within the recess; and
   a projection for preventing the splice connector from moving out the top and the bottom of the housing, while having the recess open to the top and the bottom for access to the splice connector.

2. The holder of claim 1, wherein the recess comprises a bottom wall and two side walls, the latch member comprises a resilient finger that extends along the side wall and has a protrusion on an end thereof, an opening being disposed behind the resilient finger to allow deflection of the finger during insertion and removal of the splice connector.

3. The holder of claim 1, wherein the securing member comprises a projection which extends from the end of the housing, the projection being rectangular shaped to be received within a recess on a latching arm on the telecommunications rack.

4. The holder of claim 1, wherein the fiber optic splice connector comprises two body halves with a passageway therebetween for receiving an optical fiber, the body halves being secured together to keep the optical fiber between the body halves, the body halves further having a second passageway to receive a key element to force the two body halves apart for insertion and removal of the optical fiber.

5. The holder of claim 4, wherein the passageway and the second passageway are accessible from the top and the bottom of the housing when the splice connector is secured within the recess.

6. The holder of claim 1, further comprising a second side, a pair of adjacent apertures extend from the second side to a base wall of the recess to receive a tie wrap therethrough and to secure a cable along the second side.

7. A fiber optic connector holder, comprising:
   a housing having a front side, a top, a bottom, and two ends, the ends having securing members to secure the housing to a telecommunications rack;
   a recess disposed along the front side of the housing, the recess extending from the top to the bottom of the housing and being open to the top and to the bottom, the recess having dimensions such that a fiber optic splice connector is received substantially within the recess;
   a latch member for securing the fiber optic splice connector within the recess;
   a projection for preventing the splice connector from moving out the top and the bottom of the housing, while still having the recess open to the top and the bottom for access to the splice connector; and
   a splice connector to be received within the recess, the connector having a connecting passageway to connect two optical fibers.

8. The holder of claim 7, wherein the recess comprises a bottom wall and two side walls, the latch member comprises a resilient finger that extends along the side wall and has a protrusion on an end thereof, an opening being disposed behind the resilient finger to allow deflection of the finger during insertion and removal of the splice connector.

9. The holder of claim 7, wherein the securing member comprises a projection which extends from the end of the housing, the projection being rectangular shaped to be received within a recess on a latching arm on the telecommunications rack.

10. The holder of claim 7, wherein the fiber optic splice connector comprises two body halves with a passageway therebetween for receiving a optical fiber, the body halves being secured together to keep the optical fiber between the body halves, the body halves further having a second passageway to receive a key element to force the two body halves apart for insertion and removal of the optical fiber.

11. The holder of claim 10, wherein the passageway and the second passageway are accessible from the top and the bottom of the housing when the splice connector is secured within the recess.

12. A fiber optic connector assembly, comprising:
   a telecommunications rack having a base and upstanding latching arms;
   a holder having a housing with a front side, a top, a bottom, and two ends, the ends having securing members to secure the housing to the latching arms on the telecommunications rack;
   a recess disposed along the front side of the housing, the recess extending from the top to the bottom of the housing and being open to the top and to the bottom, the recess having dimensions such that a fiber optic splice connector is received substantially within the recess;
   a latch member for securing the fiber optic splice connector within the recess;
   a projection for preventing the splice connector from moving out the top and the bottom of the housing, while still having the recess open to the top and the bottom for access to the splice connector; and
   a splice connector to be received within the recess, the connector having a connecting passageway to connect two fiber optic cables.

13. The holder of claim 12, wherein the recess comprises a bottom wall and two side walls, the latch member comprises a resilient finger that extends along the side wall and has a protrusion on an end thereof, an opening being disposed behind the resilient finger to allow deflection of the finger during insertion and removal of the splice connector.

14. The holder of claim 12, wherein the securing member comprises a projection which extends from the end of the housing, the projection being rectangular shaped to be received within a recess on a latching arm on the telecommunications rack.

15. The holder of claim 12, wherein the fiber optic splice connector comprises two body halves with a passageway therebetween for receiving a optical fiber, the body halves being secured together to keep the optical fiber between the body halves, the body halves further having a second passageway to receive a key element to force the two body halves apart for insertion and removal of the optical fiber.

16. The holder of claim 15, wherein the passageway and the second passageway are accessible from the top and the bottom of the housing when the splice connector is secured within the recess.

* * * * *